United States Patent [19]

Campbell et al.

[11] Patent Number: 4,865,168
[45] Date of Patent: Sep. 12, 1989

[54] VEHICLE DISC BRAKES OF THE LIQUID COOLED TYPE

[75] Inventors: Roy Campbell, Worcestershire, England; Anthony G. Price; Andrew P. Green, both of Gwent, Wales

[73] Assignee: Lucas Industries public limited company, Birmingham, England

[21] Appl. No.: 225,308

[22] Filed: Jul. 28, 1988

[30] Foreign Application Priority Data

Jul. 28, 1987 [GB] United Kingdom ................ 8717876
Sep. 21, 1987 [GB] United Kingdom ................ 8722294

[51] Int. Cl.⁴ ........................................ F16D 65/853
[52] U.S. Cl. .............................. 188/264 P; 188/71.6
[58] Field of Search ................ 188/71.6, 72.2, 264 E, 188/264 D, 264 P, 264 CC

[56] References Cited

U.S. PATENT DOCUMENTS

| | | | |
|---|---|---|---|
| 3,061,048 | 10/1962 | Alsobrooks et al. | 188/264 P X |
| 3,791,498 | 2/1974 | Wassermann | 188/264 P X |
| 3,907,073 | 9/1975 | Harrison | 188/264 P X |
| 4,207,969 | 6/1980 | Howell | 188/264 P X |

Primary Examiner—Duane A. Reger
Attorney, Agent, or Firm—Oldham & Oldham Co.

[57] ABSTRACT

A brake of the self-energising liquid cooled type incorporates a pump mechanism for pumping liquid from a sump to a braking member which is slidably keyed to a shaft to be braked. The pump mechanism incorporates one rotatable pump member which is driven from the shaft and may be housed within a pressure plate which forms a part of an actuating mechanism for the brake. Alternatively the pump may comprise a turbo-disc which is separate from the brake and is spaced from the stack of braking members.

17 Claims, 16 Drawing Sheets

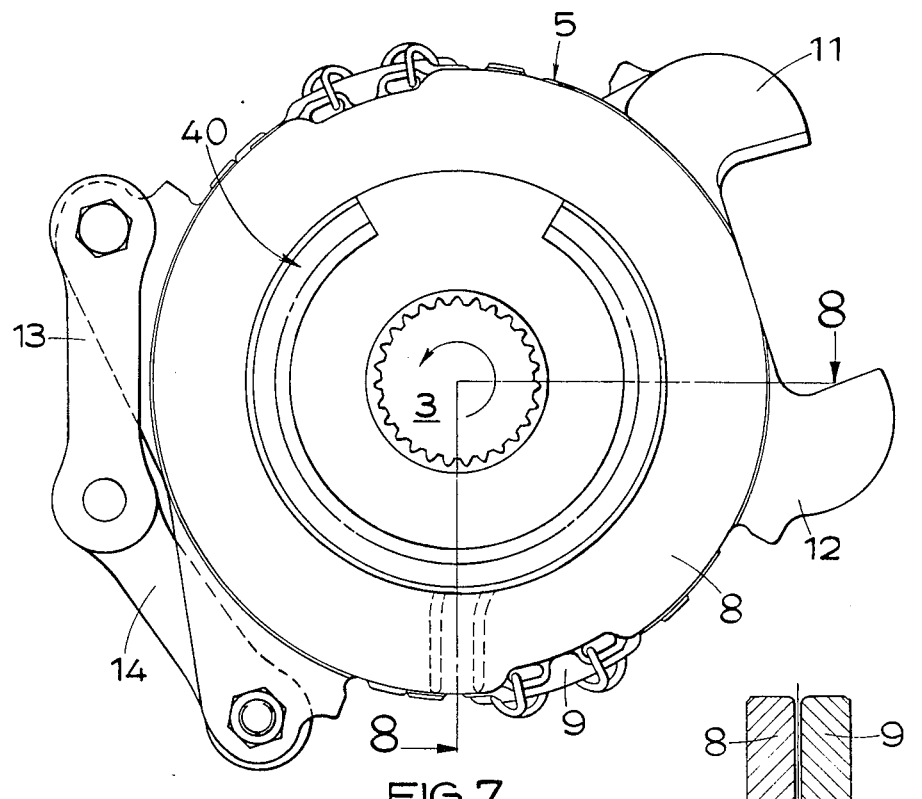
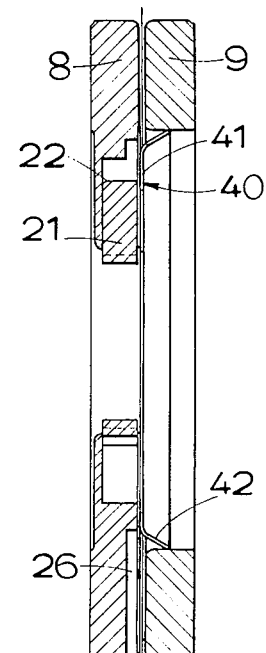
FIG. 7.
FIG. 8.

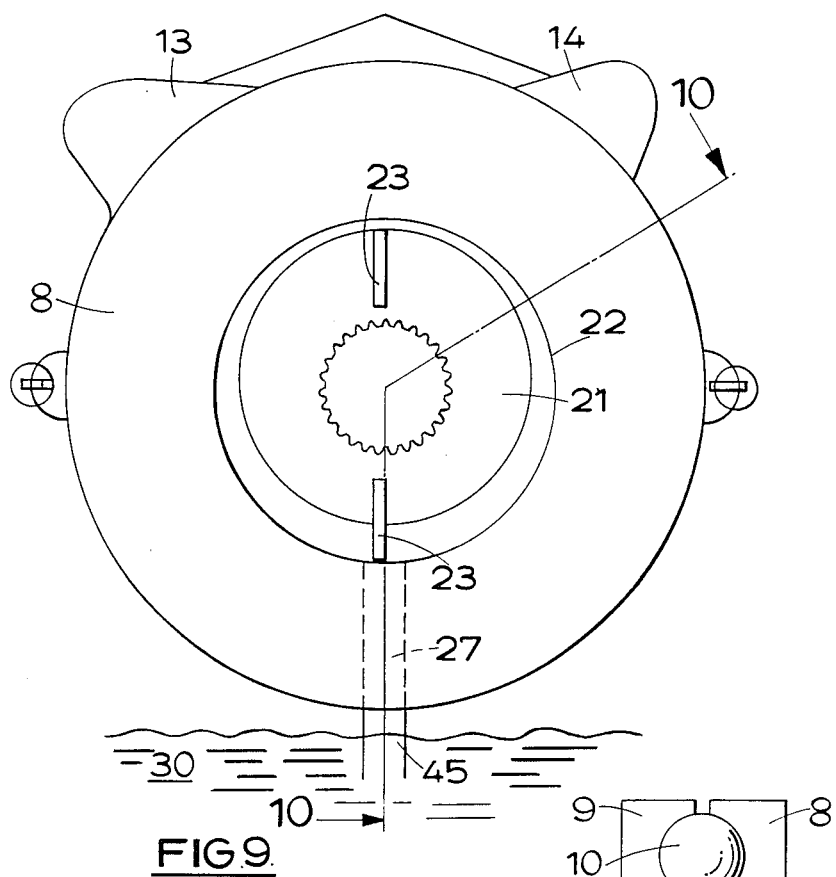
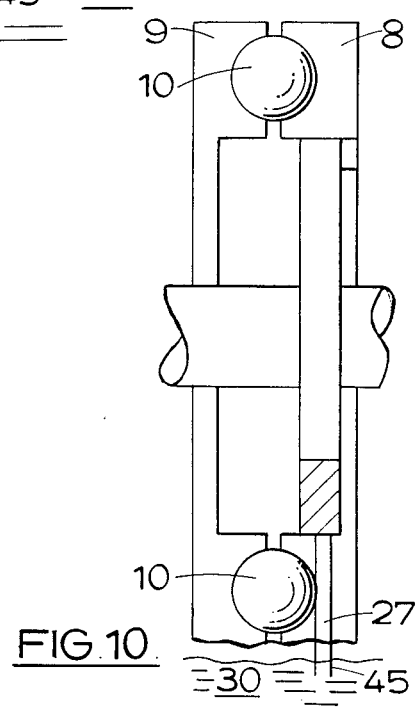

VEHICLE DISC BRAKES OF THE LIQUID COOLED TYPE

This invention relates to improvements in vehicle disc brakes of the liquid-cooled type, of the kind in which at least one rotatable friction braking member is slidably keyed to a shaft to be braked and is rotatable in a housing containing a cooling liquid for cooling the braking member, and actuating means is provided for urging the braking member into engagement with a relatively stationary braking surface to apply the brake.

Brakes of the kind set forth are commonly used in tractors or the like vehicles, and the cooling liquid usually comprises oil from the gearbox. In order to minimize parasitic drag, particularly when the oil is cool, and conserve consequent power, it is usual for the oil in the gearbox to be maintained substantially at the minimum level only necessary to provide adequate lubrication. This, in turn, creates the problem that such a minimum level represents a volume or depth of oil adjacent to the brake which is normally inadequate to achieve a degree of cooling of the braking member necessary to sustain a minimum wear life for the lining.

According to our invention, in a disc brake of the kind set forth a region at the base of the housing defines a sump for liquid, and the brake incorporates a pump mechanism for pumping liquid from the sump to the braking member in order to cool the braking surfaces, the pump mechanism having an inlet or pick-up point below the level of the liquid, an outlet or discharge point disposed within the projected area of the braking member, and a rotatable pump member driven from the shaft for transferring liquid from the inlet or pick-up point to the outlet or discharge point.

When the pump member is driven continuously by the shaft, the liquid is constantly pumped to the braking member.

The provision of the pump mechanism ensures that better use is made of the minimum volume of liquid available.

The pump member may comprise a braking member itself in the form of a planar metal plate or a metal plate provided on one or each side with a lining of friction material. Alternatively the pump member may comprise a separate rotor in addition to one or more braking members.

When the pump member comprises a braking member, the braking member is provided with means defining on at least one side of the member an annular chamber which opens in a radially outwards direction, and a plurality of angularly spaced vanes which extend between axially spaced end walls of the chamber and act as scoops to raise liquid from the sump to the discharge point.

In one such construction the annular chamber is provided on one side only of the braking member, and an opening disposed in the member at the inner end of each vane acts as a transfer passage for liquid to the opposite side of the member, from whence the liquid can flow over that side of the braking member due to centrifugal force.

The openings may be elongate in a circumferential direction, and may lead into an annular distribution chamber on the said opposite side of the braking member, which distribution chamber is provided in its radially outermost edge with a circumferentially extending mouth of reduced axial thickness disposed adjacent to the said opposite side.

When the pump member comprises the said separate rotor it may be incorporated adjacent to the friction braking member, in the actuating means itself, or it may be separate from the braking members or stack and be located outside the brake.

When the actuating means comprises a pair of annular pressure plates which are located between a pair of axially spaced friction braking members and are centered by stationary pilot lugs on the housing, and balls or rollers are located in co-operating oppositely inclined recesses in the adjacent faces of the pressure plates so that, when the application of the brake is initiated by moving the pressure plates angularly in opposite directions, the pressure plates then move apart to urge the friction members into engagement with relatively stationary braking surfaces due to the tendency for the balls or rollers to ride up ramps defined by the edge of the recesses, the pressure plates then being carried round with the braking members until one is arrested by the engagement of a lug on that plate with a drag-taking stop abutment in the housing, and the continued angular movement of the other pressure plate provides a servo action, the rotor is keyed to the shaft and co-operates with an internal bore of at least one of the pressure plates.

Preferably the internal bore is eccentric and the rotor is provided with at least two vanes which co-operate with the wall of the bore to convey liquid from the inlet, to the outlet, with the inlet and the outlet being defined by ports in the wall of the pressure plate.

When two vanes are provided, they are diametrically arranged, and when more than two vanes are provided they are equally spaced angularly.

When the rotor is rotatable in the bore in one pressure plate only, the internal bore comprises the bore of a counterbored recess, and a pumping space is defined in the internal bore between the base of the recess and a cover plate attached to the opposite open inner end of the recess.

Some embodiments of our invention are illustrated in the accompanying drawings in which:

FIG. 7 is a view similar to FIG. 1 but showing another modification;

FIG. 8 is a section on the line 8—8 of FIG. 7;

FIG. 9 is a view similar to FIG. 1 of yet another brake;

FIG. 10 is a section on the line 10—10 of FIG. 9;

Figure 1:
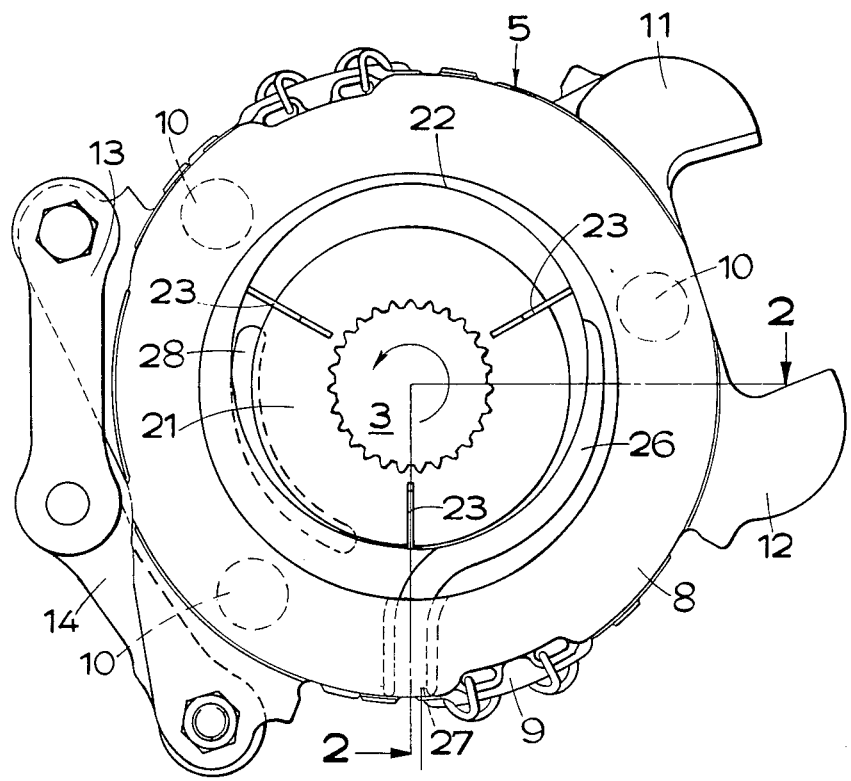
FIG. 1 is an end view of a self-energizing brake of the spreading type including a section through a shaft.
Figure 2:
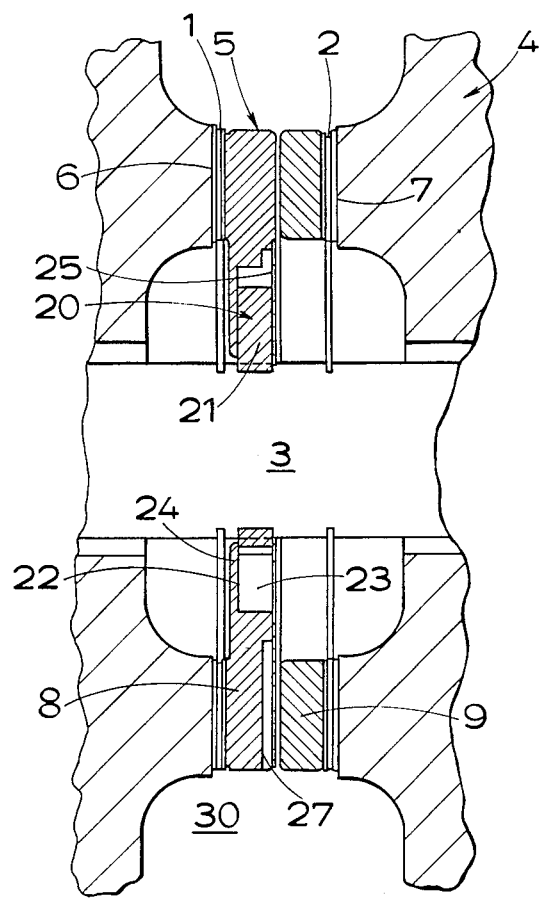
FIG. 2 is a section on the line 2—2 of FIG. 1.

The self-energizing disc brake illustrated in FIGS. 1 and 2 of the accompanying drawings is of the conventional spreading type in which two friction discs 1, 2 each provided on opposite sides with linings of friction material and splined on a shaft 3 are adapted to be brought into engagement with spaced opposed braking surfaces 6, 7 in a housing 4 by an actuating mechanism 5. The actuating mechanism 5 comprises a pair of pressure plates 8, 9 located between the discs 1, 2 and centred by angularly spaced pilot lugs (not shown) projecting inwardly from the housing 4, and balls or rollers 10 located in co-operating oppositely inclined recesses in adjacent faces of the pressure plates 8, 9.

The application of the brake is initiated by moving the pressure plates 8, 9 angularly in opposite directions. This, in turn, urges the friction discs 1, 2 into engagement with braking surfaces 6, 7 in the housing 4. The pressure plates 8, 9 are then carried round with the discs 1, 2 until one is arrested by the engagement of a lug on a respective plate 8, 9 with a drag-taking abutment in the housing 4, whereafter continued angular movement of the other plate provides a servo action.

The application of the brake can be initiated or normal service braking by means of an hydraulic actuator acting between a pair of radial lugs 11, 12 on the pressure plates, and for parking or emergency braking by moving the coupled inner ends of a pair of toggle links 13, 14 in a radially outwards direction, the toggle links at their inner ends in turn being coupled to the pressure plates 8, 9.

A rotatable vane pump 20 is installed in the actuating mechanism 5. As illustrated the pump comprises an annular rotor 21 which is keyed to the shaft, and is rotatable in an eccentric bore 22 in the pressure plate 8 which defines the pump chamber and is arranged with its portion of greatest radial dimension uppermost. The rotor 21 is provided with three angularly spaced radial vanes 23 which are radially movable in slots in the rotor 21, and are spring loaded into engagement with the wall of the bore 22. The bore 22 is machined into the pressure plate 8 from its inner face so that a wall 24 defines the outer end of the pump chamber, and the opposite, inner end, is defined by a cover plate 25.

The lower part of the housing 4 defines a sump 30 for liquid.

An inlet passage 26 in the plate 8 has an inlet port 27 located at the lowest point of the pressure plate 8, and the inlet port is immersed in the sump. The passage 26 extends circumferentially to a position above a horizontal plane passing through the axis of the shaft 3, and a circumferentially extending slot 28 is provided in the cover plate 25.

In operation, the rotor 21 rotates with the shaft 3 and draws liquid from the sump 30. The liquid is pumped from the inlet port 27 for discharge to a space above the shaft 3 for cooling the braking surfaces, and liquid is also discharged through the slot 28 so that a flow of liquid takes place in both directions from the actuator mechanism 5.

In the mechanism illustrated in FIGS. 3–6 of the accompanying drawings the vanes 23 are tangentially arranged within the rotor 21. This enables us to provide a relatively smaller rotor 21 and hence increases the swept volume and the quantity of liquid displaced for a given number of rotations.

In addition two oppositely arranged and acting reed valves 31 and 32 are mounted on opposite sides of the cover plate 25, suitably by welding. Each valve comprises a metal strip.

The valve 31 controls flow through the inlet passage from the sump 30, and the valve 32 controls the flow from the passage 26 through a port 33 in the cover plate 25.

Figure 3:
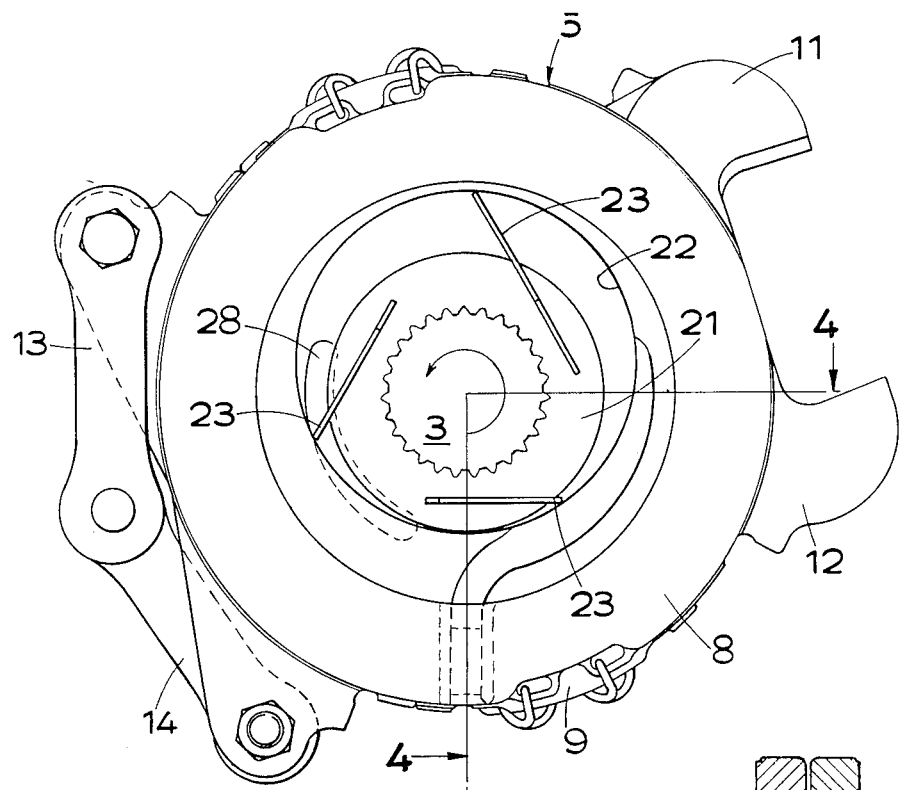
FIG. 3 is a view similar to FIG. 1 but showing a modification.
Figure 4:
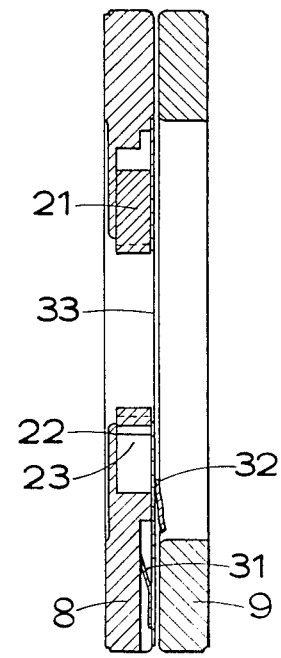
FIG. 4 is a section on the line 4—4 of FIG. 3.
Figure 5:
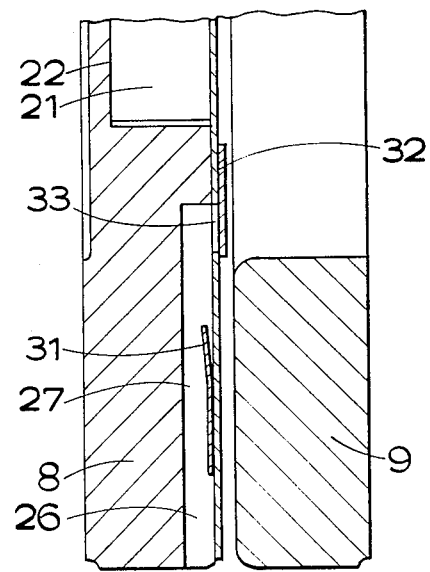
FIG. 5 is a view on an enlarged scale of a portion of FIG. 4 for a direction of normal forward rotation.
Figure 6:
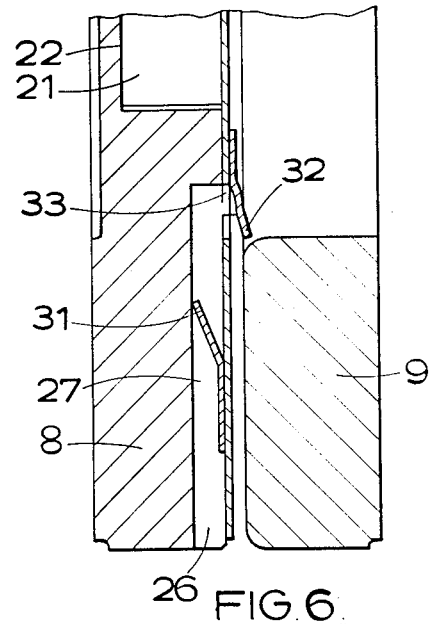
FIG. 6 is a view similar to FIG. 5 but for a direction of reverse rotation.

In operation, when the shaft 3 is rotating in the normal forward direction shown by the arrow in FIG. 3, the valve 31 is open, the pressure in the passage 26 is below ambient, and the valve 32 is closed. The pump therefore operates as described above to raise liquid from the sump for discharge to the braking surfaces.

When the shaft is rotating in the opposite reverse direction, the valve 32 is open, and the pressure in the passage 26 above the reed valve 31 is above ambient so that the reed valve 31 closes to prevent liquid being pumped back to the sump. This might otherwise cause aeration of the liquid which would reduce its effectiveness as a coolant.

The construction and operation of the brake of FIGS. 3–6 is otherwise the same as that of FIGS. 1 and 2, and corresponding reference numerals have been applied to corresponding parts.

It is desirable to seal the gap between the two pressure plates 8 and 9 to allow a build up of liquid head within the brake. This can be achieved, as illustrated in FIGS. 7 and 8, by the provision of a part annular metal pressing 40 having a base 41 which is welded to the face of the cover plate 25 remote from the rotor 21 and an external radial flange 42 which engages sealingly with the internal wall of the annular pressure plate 9. The pressing 40 extends circumferentially for at least 270°, and a gap between the ends of the pressing is arranged at the upper end of the brake.

In the brake illustrated in FIGS. 9 and 10 of the drawings, the pump rotor 21 is provided with a pair of diametrically arranged vanes 23, and the inlet port 27 communicates with the sump 30 through a dip tube 45.

The construction and operation of the brake of FIGS. 9 and 10 is otherwise the same as that of FIGS. 1 and 2, and corresponding reference numerals have been applied to corresponding parts.

Figure 11:
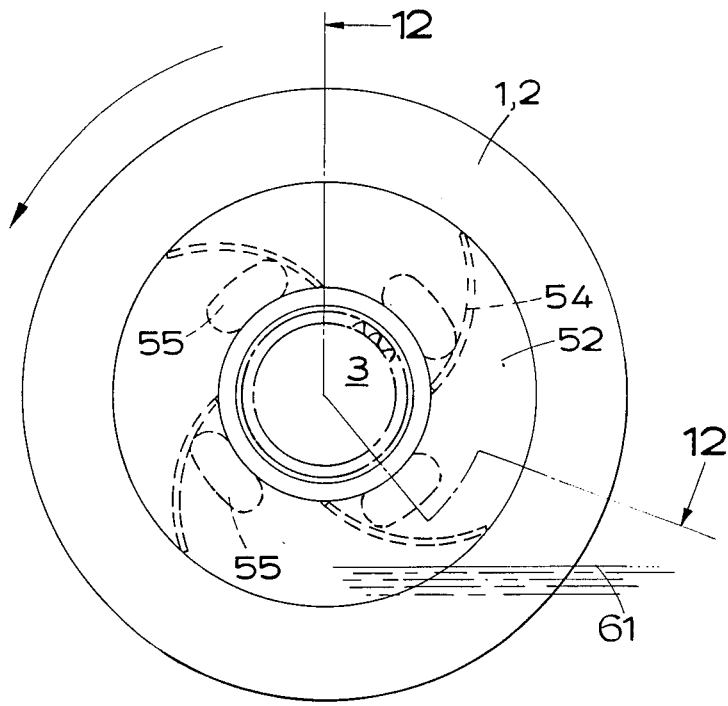
FIG. 11 is an end view of a friction member in combination with a pump mechanism.
Figure 12:
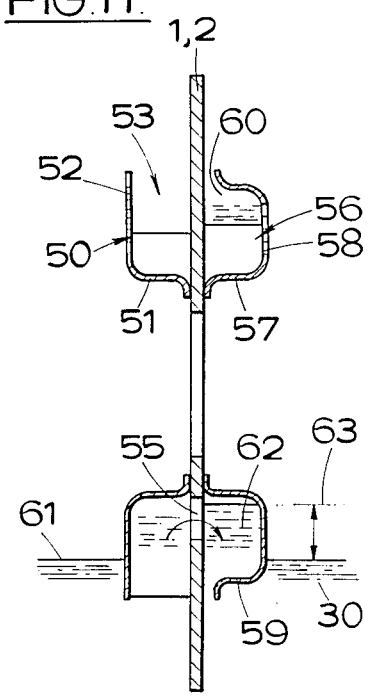
FIG. 12 is a section on the line 12—12 of FIG. 11.

In another construction, the pump is omitted from the actuating mechanism 5, and each friction disc 1, 2 is adapted to form a pump impellor. As illustrated in FIGS. 11 and 12 of the drawings, the disc 1, 2 is provided on one side with an annular dish shaped member 50 comprising a cylindrical body part 51 which is secured to the disc 1, 2 surrounding its central opening, and a radial flange 52 which extends outwardly from the outer end of the body part 51. An annular chamber 53, which opens outwardly, is defined between the flange 52 and the braking member 1, 2. A plurality of angularly spaced vanes or scoops 54 of arcuate outline extend between the body part 51, the flange 52 and the braking member 1, 2 to raise liquid from the sump 30 when the disc 1, 2 is rotating in a normal forward direction.

A plurality of openings 55, each of which is elongate in a circumferential direction, are provided in the disc adjacent to the body part 51. Each opening 55 is disposed adjacent to the inner end of the concave side of each vane 54.

The opposite side of the disc 1, 2 carries an annular member 56 substantially of U or channel outline which is superimposed at its inner end over the member 50. The member 56 has a cylindrical body part 57, from the outer end of which a radial flange 58 extends in an outwards direction, and the flange 58 is cranked at intermediate point in its length to form a circumferentially extending axial extension 59 which is spaced at its free end from the friction disc 1, 2 to define an annular gap 60 for the escape of liquid.

When the disc is rotating in a normal forward direction, the liquid is raised from the sump 30 at the level 61 by the vanes 54, and passes through the openings 55 into the interior of the member 56 which defines a reservoir 62, and from which it can escape to the braking surfaces through the gap 60.

The vanes 54 raise the liquid from the level 61 to an effective level 63 in the reservoir 62.

In a reverse direction of rotation, substantially no liquid will be raised from the sump 30.

Figure 14:
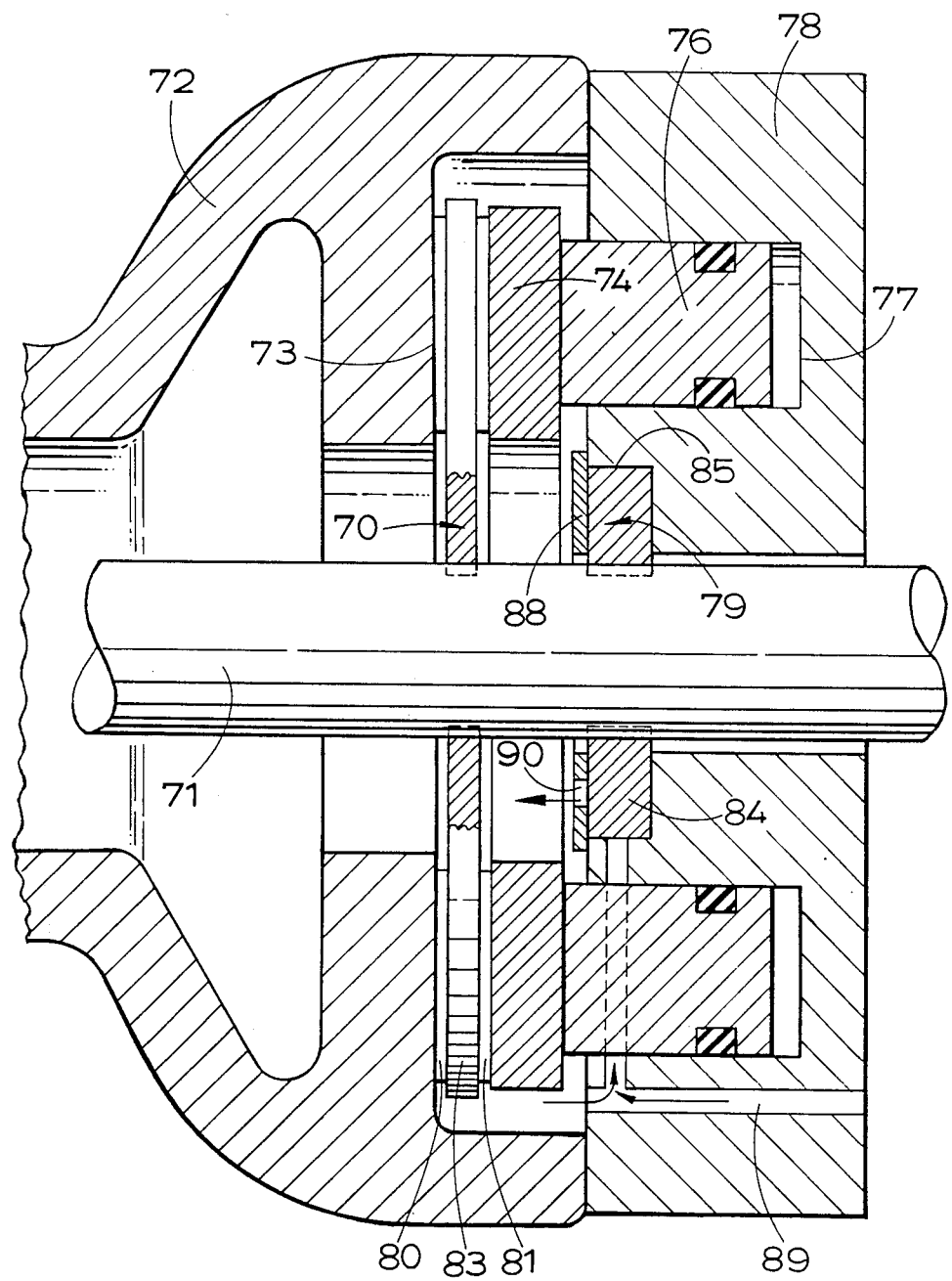
FIG. 14 shows the pump mechanism of FIG. 13 incorporated in a brake.

In the liquid-cooled disc brake illustrated in FIG. 14 of the drawings, an axially movable friction disc 70 slidably mounted on a shaft 71 to be braked and located in a housing 72 is adapted to be clamped between a braking face 73 on the housing 72 and an annular pressure plate 74. The pressure plate 74 is guided for axial sliding movement in the housing and is adapted to be urged into engagement with the friction disc 70 to apply the brake by the operation of an annular hydraulic piston 76 which works in an annular cylinder 77 in the adjacent end wall 78 of the housing 72.

A pump mechanism 79 is incorporated in the end wall 78 of the housing to pump cooling liquid to the friction linings 80, 81 carried by opposite faces of a core plate 83, and which together with the linings, constitutes the friction disc 70.

The pump mechanism 79 comprises an annular rotor 84 which is keyed to the shaft 71, and is rotatable in an eccentric bore 85 in the end wall 78 which defines a pump chamber and which is arranged with its portion of greatest radial dimension uppermost. The rotor is provided with three angularly spaced radial vanes 86, which are radially movable in slots 87 in the rotor, and are spring-loaded into engagement with the wall of the bore 85. The bore 85 is machined into the inner end face of the end wall 78, with the outer end closed by a cover plate 88 defining the outer end of the pump chamber.

In operation, the rotor 84 rotates with the shaft 71 and draws liquid from an inlet passage 89 for discharge to a space above the inner peripheral edge of the linings 80, 81 through a circumferentially extending outlet port 90 in the cover plate 88.

Figure 15:
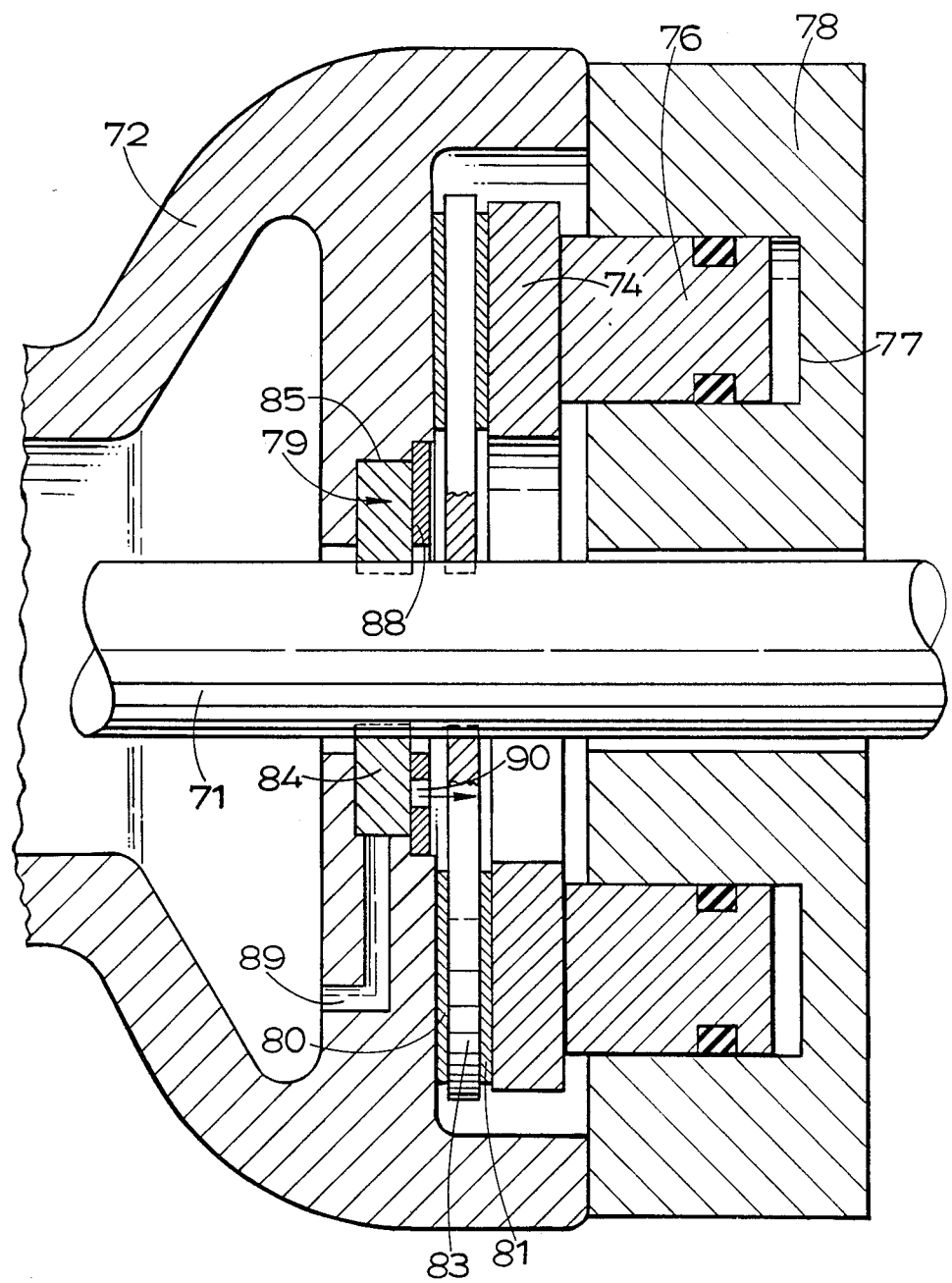
FIG. 15 is similar to FIG. 14 but shows a modified installation.

In the brake illustrated in FIG. 15 of the drawings the pump mechanism 79 is installed in the wall of the housing 72 which incorporates the braking face 73, in a position disposed radially inwardly of the inner radial edges of the friction lining 80 and 81.

Figure 13:
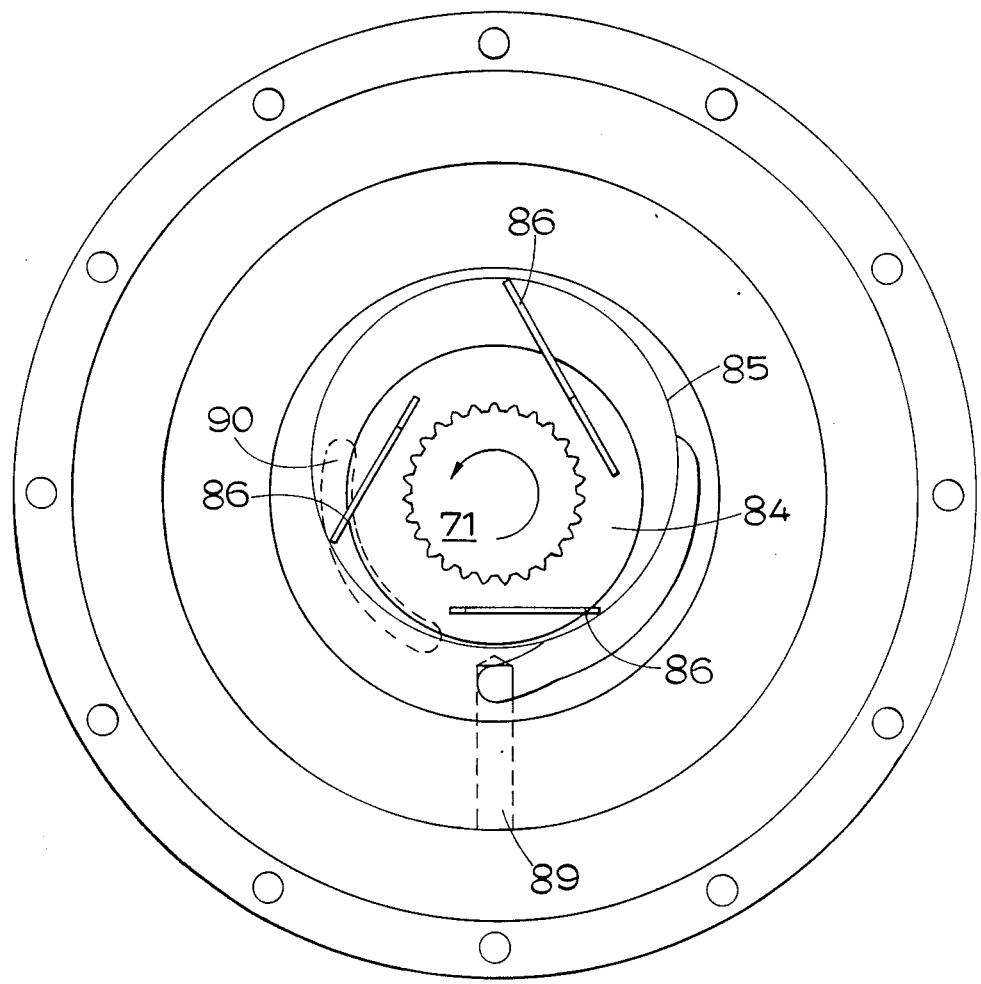
FIG. 13 is end view of another pump mechanism.

The construction and operation is otherwise the same as that of FIGS. 13 and 14 and corresponding reference numerals have been applied to corresponding parts.

Figure 16:
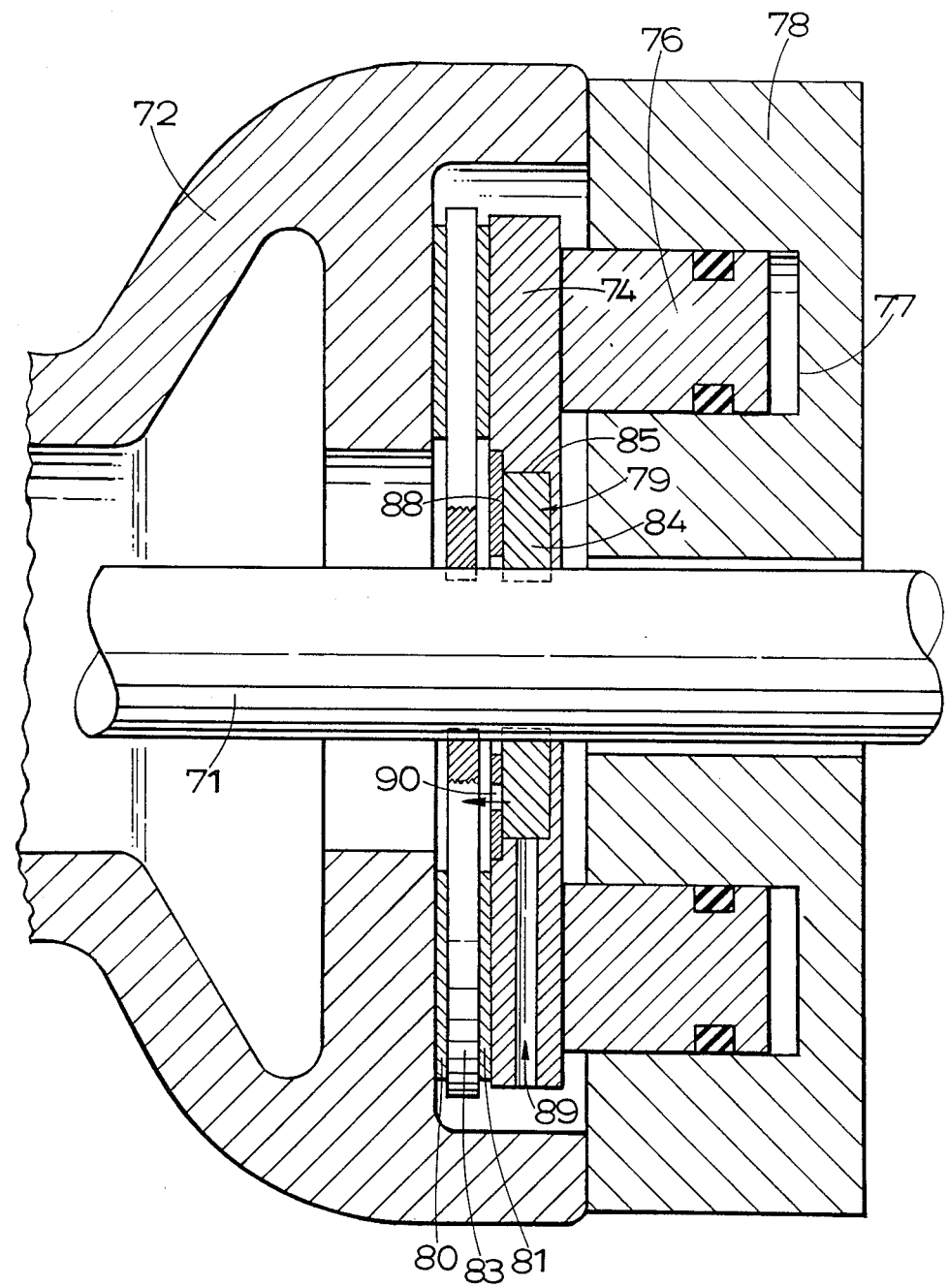
FIG. 16 is again similar to FIG. 14 but shows the pump mechanism incorporated in a pressure plate.

In the brake illustrated in FIG. 16 the pressure plate 74 is increased inwardly in a radial direction and the pump mechanism 79 is incorporated in the pressure plate 74 itself.

Figure 17:
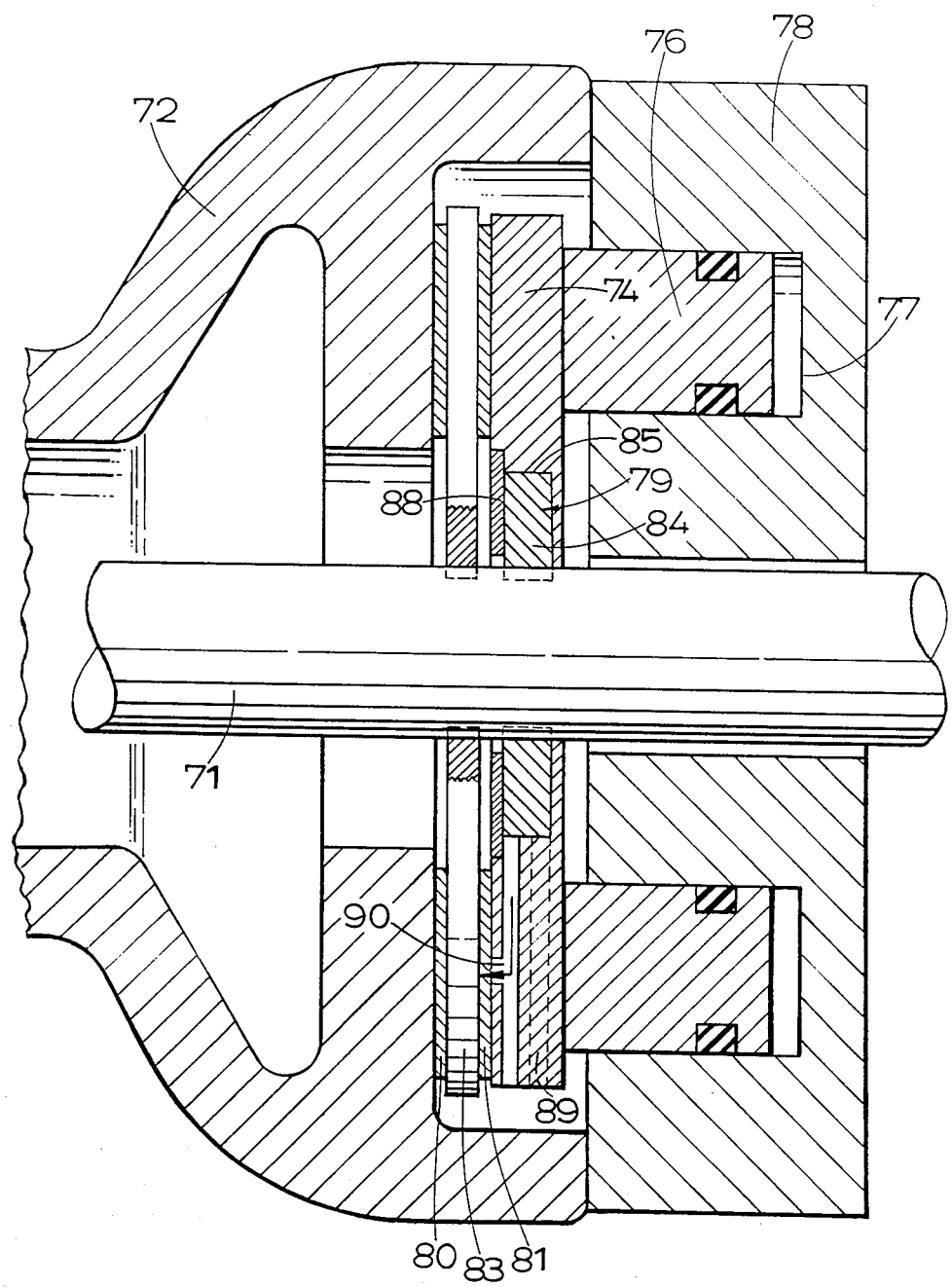
FIG. 17 is similar to FIG. 16 but showing a modification.

The brake illustrated in FIG. 17 is similar to FIG. 16. In this construction however the outlet 90 from the pump mechanism 79 is positioned radially outwards and within the projected area of the friction linings 80, 81. This provides a direct feed of cooling liquid to the linings.

Figure 18:
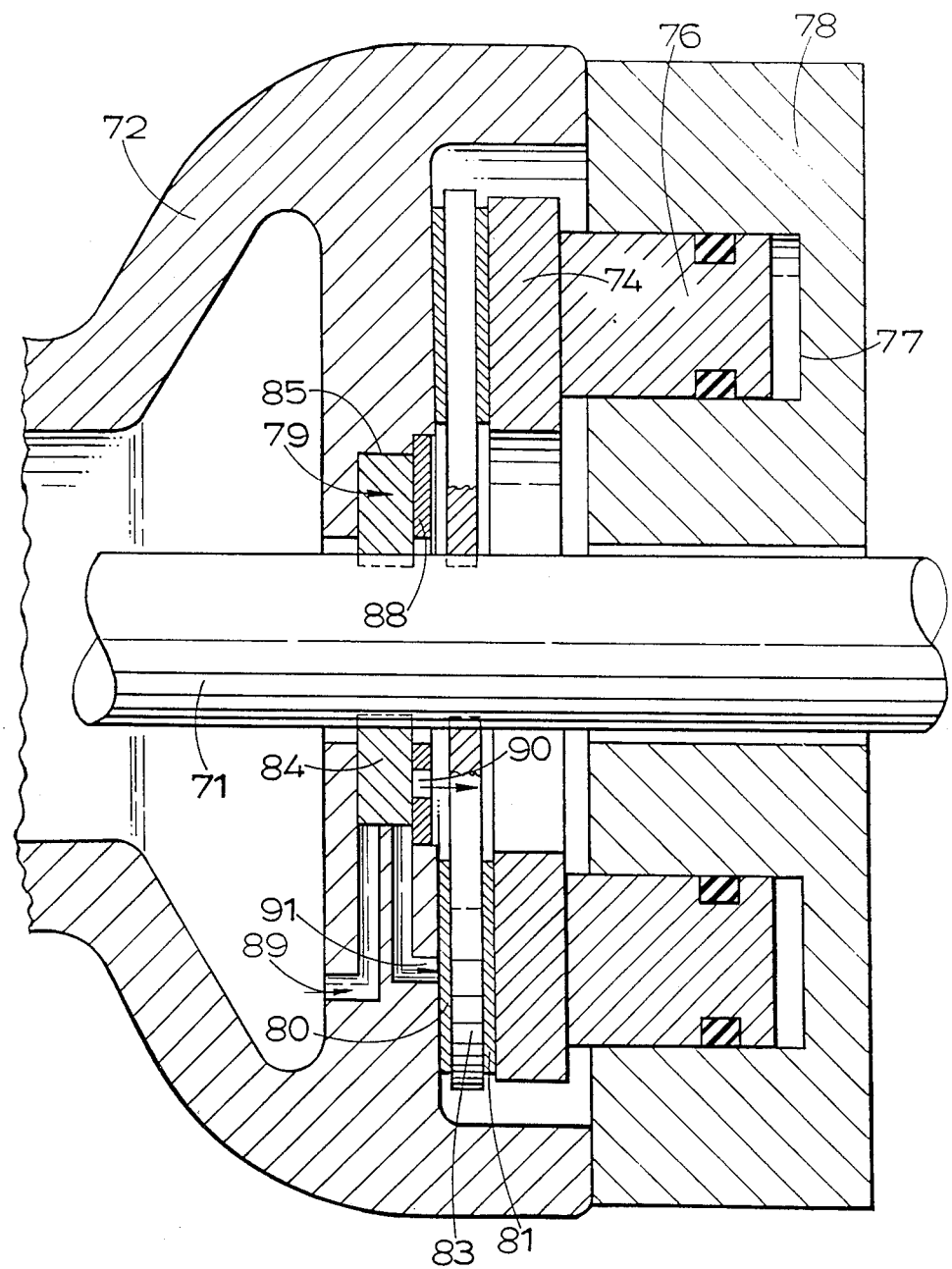
FIG. 18 is also similar to FIG. 16 but shows another modification.

The brake illustrated in FIG. 18 is similar to FIG. 16. In this construction however the housing 72 incorporates an additional outwardly directed outlet passage 91 through which liquid is fed directly to the linings by the pump in a manner similar to FIG. 17.

In the brakes identified above with reference to FIGS. 13–18, the annular piston 76 may be replaced by angularly spaced pistons working in complementary bores.

Figure 19:
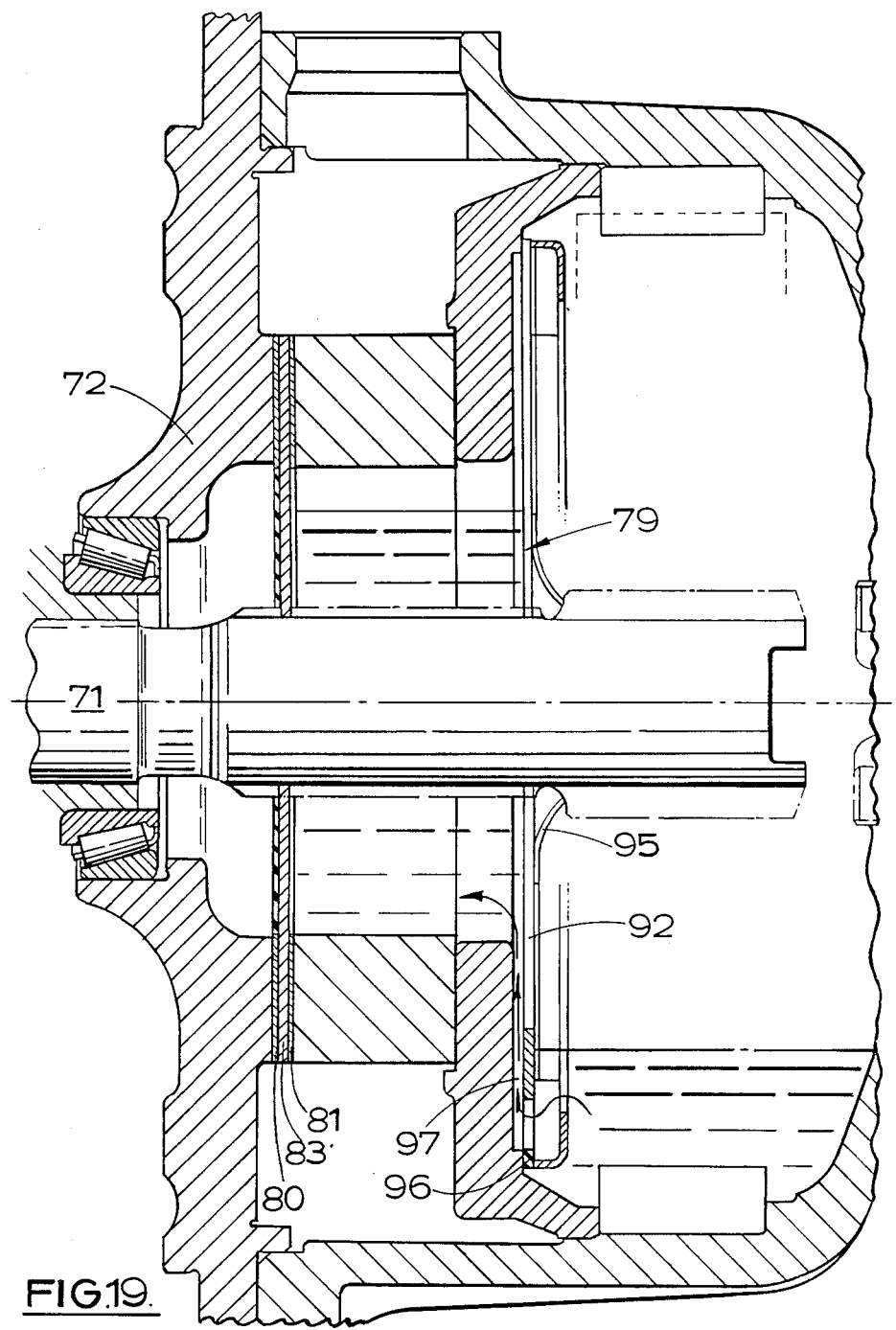
FIG. 19 is a section through another brake of the liquid-cooled type in which the pump comprises a turbo-disc separate from the stack of braking members.
Figure 20:
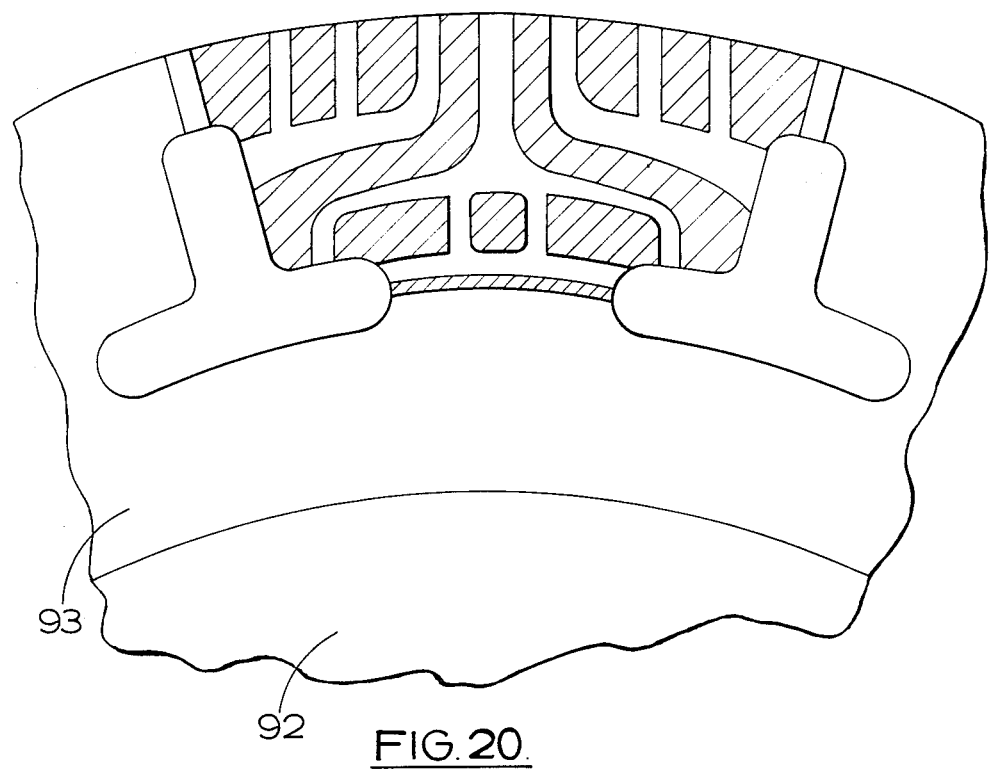
FIG. 20 is a portion of the turbo-disc of FIG. 19.

In the brake illustrated in FIG. 19 of the drawings the pump mechanism 79 comprises a turbo-disc assembly of annular outline which is separate from and outside the brake stack of which a single braking member is shown at 80, 81, 83. The disc assembly is illustrated in detail in FIG. 20 and comprises a metal core 92 provided on opposite faces with linings of friction material. The disc assembly is slotted and grooved to raise liquid and discharge it to the braking members. The disc assembly 79 need not be described further herein since it forms the subject of our co-pending Pat. application No. 8 722 295.

The disc assembly 79 is driven by the shaft or axle 71 to which it is slidably keyed. The disc assembly is of greater maximum diameter than the braking member, and therefore extends beyond the braking path. This allows greater peripheral speed in comparison with that of the braking member, larger annular volume, and much lower oil feed level, that is to say better use can therefore be made for cooling purposes of the relatively lower level of oil in the axle housing.

The outer-disc assembly is urged by a Belleville or other spring washer 95 relatively towards the stack and into engagement at its peripheral edge with an annular seal 96.

Liquid is drawn through the slots in the disc assembly and discharged to the brake through an inwardly directed liquid discharge passage 97 between the disc assembly and an adjacent face of the housing 72.

installed as

Figure 21:
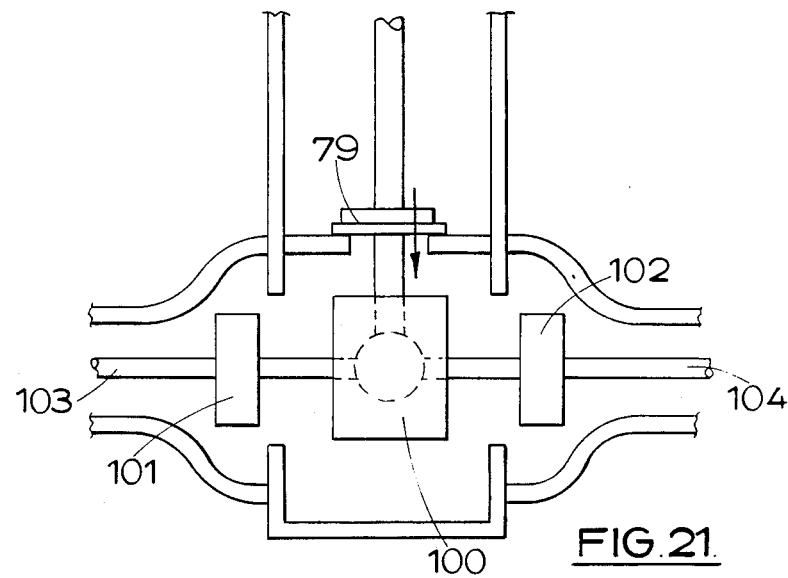
FIG. 21 shows the installation of the turbo-disc at the entrance to the differential.

The turbo-disc assembly 79 may be shown in FIG. 21 at the entrance to an axle differential 100 to pump liquid to each of two liquid cooled brakes 101, 102, each adapted to brake one respective axle or half shaft 103, 104, each driven from the differential.

Figure 22:
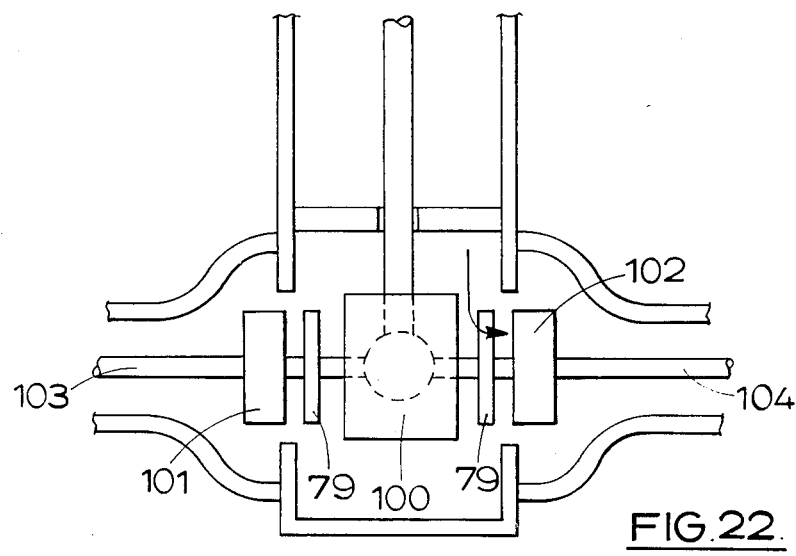
FIG. 22 shows the installation of turbo-discs in the axle itself.

In another construction shown in FIG. 22, a turbo-disc assembly 79 is associated with each brake 101, 102.

We claim:

1. A vehicle disc brake of the liquid-cooled type comprising a housing having a base and containing cooling liquid to a level, at least one rotatable friction braking member disposed within said housing and slidably keyed to shaft to be braked, means defining a relatively stationary braking surface in said housing, and actuating means for urging said braking member into engagement with said relatively stationary braking surface to apply said brake, wherein a region at said base of said housing defines a sump for liquid, with the level of said liquid in said sump being at a first level below the level of said shaft, and said brake incorporates a pump mechanism for pumping liquid from said first level in said sump to said braking member in order to cool said braking surface, said pump mechanism having an inlet or pick-up point below said first level, an outlet or discharge point disposed within the projected area of said braking member, and a rotatable pump member driven from said shaft for transferring liquid from said inlet or pick-up point to said outlet or discharge point.

2. A vehicle disc brake as claimed in claim 1, wherein said pump member comprises said braking member itself.

3. A vehicle disc brake as claimed in claim 2, wherein said braking member is provided with scoop means defining on at least one side of said member an annular chamber having axially spaced end walls and which opens in a radially outwards direction, and a plurality of angularly spaced vanes having inner ends and outer ends and which extend between said axially spaced end walls and act as scoops to raise liquid from said sump to said discharge point.

4. A vehicle disc brake as claimed in claim 3, wherein said annular chamber is provided on one side only of said braking member, and an opening disposed in said member at said inner end of each said vane acts as a transfer passage for liquid to the opposite side of said member, from whence said liquid can flow over said opposite side of said member due to centrifugal force.

5. A vehicle disc brake as claimed in claim 4, including means defining an annular distribution chamber on said opposite side of braking member, wherein said openings are elongate in a circumferential direction, and lead into said annular distribution chamber, said distribution chamber being provided in radially outermost edge thereof with a circumferentially extending mouth of reduced axial thickness disposed adjacent to the said opposite side of said braking member.

6. A vehicle disc brake as claimed in claim 1, wherein said pump member comprises a separate rotor in addition to the said at least one braking member.

7. A vehicle disc brake as claimed in claim 6, wherein said pump member is incorporated adjacent to said friction braking members in said actuating means itself.

8. A vehicle disc brake as claimed in claim 6, wherein said pump member is separate from said braking members and is located outside said brake.

9. A self-energizing disc brake of the liquid cooled type comprising a housing having a base and containing cooling liquid to a level, first and second axially spaced braking surfaces in said housing, and radial pilot lugs and a drag-taking stop abutment in said housing, and actuating means in said housing, said actuating means comprising first and second annular pressure plates centred on said pilot lugs, adjacent faces of said pressure plates being provided with co-operating oppositely inclined angularly spaced recesses, and rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein a region of said base of said housing defines a sump for liquid, and said brake incorporates a pump mechanism having a inlet below said level of liquid in said sump, and an outlet disposed within the projected area of said braking members, said pump mechanism comprising a rotor keyed to said shaft, and one of said pressure plates is provided with an internal wall defining an internal bore with which said rotor is adapted rotatably to co-operate.

10. A vehicle disc brake as claimed in claim 9, wherein said internal bore is eccentric and said rotor is provided with at least two vanes which co-operate with said wall of said bore to convey liquid from said inlet to said outlet, with said inlet and said outlet being defined by ports in said wall of the said one pressure plate.

11. A vehicle disc brake as claimed in claim 10, wherein two diametrically opposed vanes are provided.

12. A vehicle disc brake as claimed in claim 10, wherein said vanes are equally spaced angularly.

13. A vehicle disc brake as claimed in claim 9, wherein said rotor is rotatable in said bore in said one pressure plate only, and said internal bore comprises the bore of a counterbored recess, and a pumping space is defined in said internal bore between the base of said counterbored recess and a cover plate attached to the opposite open inner end of said recess.

14. A vehicle disc brake as claimed in claim 13, wherein two oppositely arranged and acting reed valves are mounted on opposite sides of said cover plate.

15. A self-energizing disc brake of the liquid cooled type comprising a housing having a base and containing cooling liquid to a level, first and second axially spaced braking surfaces in said housing, and radial pilot lugs and a drag-taking stop abutment in said housing, and actuating means in said housing, said actuating means comprising first and second annular pressure plates centred on said pilot lugs, adjacent faces of said pressure plates being provided with co-operating oppositely inclined angularly spaced recesses, and rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein a region of said base of said housing defines a sump for liquid, and said brake incorporates a pump mechanism having a inlet below said level of liquid in said pump, and an outlet disposed within the projected area of said braking members, said pump mechanism comprising a rotor keyed to said shaft, and a member defining a pumping chamber in which said rotor is located for rotation about the axis of said shaft, and wherein said pumping chamber is eccentrically disposed relative to the axis of said shaft.

16. A vehicle disc brake of the liquid-cooled type comprising a housing having a base and containing cooling liquid to a level, at least one rotatable friction braking member disposed within said housing and slidably keyed to shaft to be braked, means defining a relatively stationary braking surface in said housing, and actuating means for urging said braking member into engagement with said relatively stationary braking surface to apply said brake, a region at said base of said housing defining a sump for liquid with the level of said liquid in said sump being at a first level substantially below the level of said shaft, and said brake incorporating a pump mechanism for pumping liquid from said first level in said sump to said braking member in order to cool said braking surface, said braking member depending into said liquid in said sump below said first level and being adapted to transfer said liquid to an outlet or discharge point disposed within the projected area of said braking member, wherein said braking member is provided with scoop means defining on at one side only of said member an annular chamber having axially spaced end walls and which annular chamber opens in a radially outwards direction, and a plurality of angularly spaced vanes having inner ends and outer ends and which extend between said axially spaced end walls and act as scoops to raise liquid from said sump to said discharge point, and wherein said braking member has an opening extending through said member at said inner end of each said vane which opening acts as a transfer passage for liquid to the opposite side of said member, from whence said liquid can flow over said opposite side of said member due to centrifugal force.

17. A vehicle disc brake as claimed in claim 16, including means defining an annular distribution chamber on said opposite side of braking member, wherein said openings are elongate in a circumferential direction, and lead into said annular distribution chamber, said distribution chamber being provided in radially outermost edge thereof with a circumferentially extending mouth of reduced axial thickness disposed adjacent to the said opposite side of said braking member.

* * * * *